(12) United States Patent
Evircan et al.

(10) Patent No.: US 10,009,784 B1
(45) Date of Patent: Jun. 26, 2018

(54) REMOTE DETECTION AND ANALYSIS OF PASSIVE INTERMODULATION PROBLEMS IN RADIO BASE STATIONS

(71) Applicant: Yupana, Inc., Concord, CA (US)

(72) Inventors: Hakan Evircan, Pleasant Hill, CA (US); Emir Kursad Ulusoy, Pleasant Hill, CA (US); Muzaffer Mete Dalan, Orinda, CA (US)

(73) Assignee: YUPANA, INC., Concord, CA (US)

( * ) Notice: Subject to any disclaimer, the term of this patent is extended or adjusted under 35 U.S.C. 154(b) by 0 days. days.

(21) Appl. No.: 15/610,912

(22) Filed: Jun. 1, 2017

Related U.S. Application Data

(60) Provisional application No. 62/392,416, filed on Jun. 1, 2016.

(51) Int. Cl.
| | |
|---|---|
| *H04W 24/00* | (2009.01) |
| *H04W 24/08* | (2009.01) |
| *H04B 17/318* | (2015.01) |
| *H04L 12/26* | (2006.01) |
| *H04L 12/24* | (2006.01) |
| *H04W 88/08* | (2009.01) |

(52) U.S. Cl.
CPC .......... *H04W 24/08* (2013.01); *H04B 17/318* (2015.01); *H04L 41/0813* (2013.01); *H04L 43/04* (2013.01); *H04L 43/16* (2013.01); *H04W 88/08* (2013.01)

(58) Field of Classification Search
CPC ............. H04W 24/08; H04W 72/0453; H04W 72/082; H04W 24/10; H04W 52/367; H04W 24/06
USPC .................................. 455/63.1, 114.2, 278.1
See application file for complete search history.

(56) References Cited

U.S. PATENT DOCUMENTS

| | | | | |
|---|---|---|---|---|
| 2014/0153418 | A1* | 6/2014 | Hariharan ............. | H04W 24/10 370/252 |
| 2017/0353929 | A1* | 12/2017 | Tacconi .............. | H04W 28/048 |

* cited by examiner

*Primary Examiner* — Ronald Eisner
(74) *Attorney, Agent, or Firm* — Dergosits & Noah LLP; Todd A. Noah

(57) ABSTRACT

Systems and methods are described for configuring a base station node. A set of base station parameters are received by a remote control unit. The remote control unit receives and installs dynamic parameter values for base station setup selected by a server application based on the received base station parameters. The remote control unit also receives dynamic parameter values for network integration generated by the server application via the network connection, the dynamic parameter values for network integration being generated in response to a user selection. The remote control unit may then configure the base station node using the dynamic parameter values for network integration. When configuration is complete, the remote control unit may transmit an indication to the server application, and finalizes integration of the base station node in response to a request from the server application.

19 Claims, 9 Drawing Sheets

REMOTE DETECTION AND ANALYSIS OF PASSIVE INTERMODULATION PROBLEMS IN RADIO BASE STATIONS

CROSS-REFERENCE TO RELATED APPLICATIONS

The present application claims the benefit of the U.S. Provisional Application No. 62/392,416, filed on Jun. 1, 2016, the entire contents of which are incorporated herein.

TECHNOLOGICAL FIELD

The present disclosure generally relates to radio access networks of wireless broadband communication systems, and more particularly radio base stations and the identification and analysis of passive intermodulation ("PIM") at the base stations remotely using specially-designed processing methods.

SUMMARY

Systems and methods are described for remotely identifying and resolving PIM problems for radio base stations. A set of key performance indicators (KPIs) over a predetermined period of time for a plurality of radio base stations are received by a database server over a network connection. Stability factors are determined for each KPI of the set of KPIs, the stability factors being defined as a difference between an approximate peak time value of each KPI and a value of each KPI at a received signal strength indicator (RSSI) peak time. The stability factors may be determined based on the received KPIs over the predetermined period of time. The database server may also determine correlation factors for each KPI of the set of KPIs, the correlation factors being defined as how closely changes in the RSSI affect values of each KPI. The correlation factors may also be determined based on the received KPIs over the predetermined period of time. The database server may then select KPIs to be RSSI Effecting Reference KPIs (RERKs) based on a comparison of the stability factors and the correlation factors for the set of KPIs. The determined stability factors and the determined correlation factors for the selected RERKs may be stored by the database server.

The database server may receive KPIs for an identified radio base station, the KPIs including RSSI values and RERK values for the identified radio base station. Based on RERK values for the identified radio base station at a peak RSSI value time for the identified radio base station and the determined correlation factors for the selected RERKs, the database server may determine an expected peak RSSI value. A difference may then be determined between the determined expected peak RSSI value for the identified radio base station and an peak RSSI value measured at the peak RSSI value time for the identified radio base station. When the determined difference exceeds a first threshold, a recommendation to a user that the identified radio base station be investigated for passive intermodulation problems may be generated.

Additional embodiments may include generating the recommendation for the user only after the determined difference exceeds the first threshold for a plurality of RSSI peak times for the identified radio base station, forming a trend. The database server may also identify values of RERKs at a RSSI quiet time. Using the identified RERK values, an expected quiet RSSI value may be determined and used to detect the presence of potential external interference, in addition to detecting potential passive intermodulation problems. Also, when the determined difference exceeds the first threshold, a request may be sent to an Operations and Support System (OSS) to perform an automated parameter change for the identified radio base station, which may ameliorate the detected passive intermodulation problem without requiring on-site investigation of the radio base station.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

PIM identification has become an important component in the acceptance and troubleshooting process of modern communications systems. PIM has become a well-known challenge in modern wireless communication systems, and in particular cellular wireless systems, due to the increased complexity and utilization of the available radio frequency spectrum occupied by a wide variety of cellular systems, such as GERAN (GSM EDGE Radio Access Network), UTRAN (UMTS Terrestrial Radio Access Network), E-UTRAN (Evolved UMTS Terrestrial Radio Access Network) and LTE (Long Term Evolution). With the increased receiver sensitivity of recent cellular technologies (such as LTE and LTE-compatible devices), that can function with lower power levels compared to older technologies, PIM products may have greater impact on system performance. This makes PIM testing and identification more crucial and necessary for reaching optimum service performance.

Figure 1:
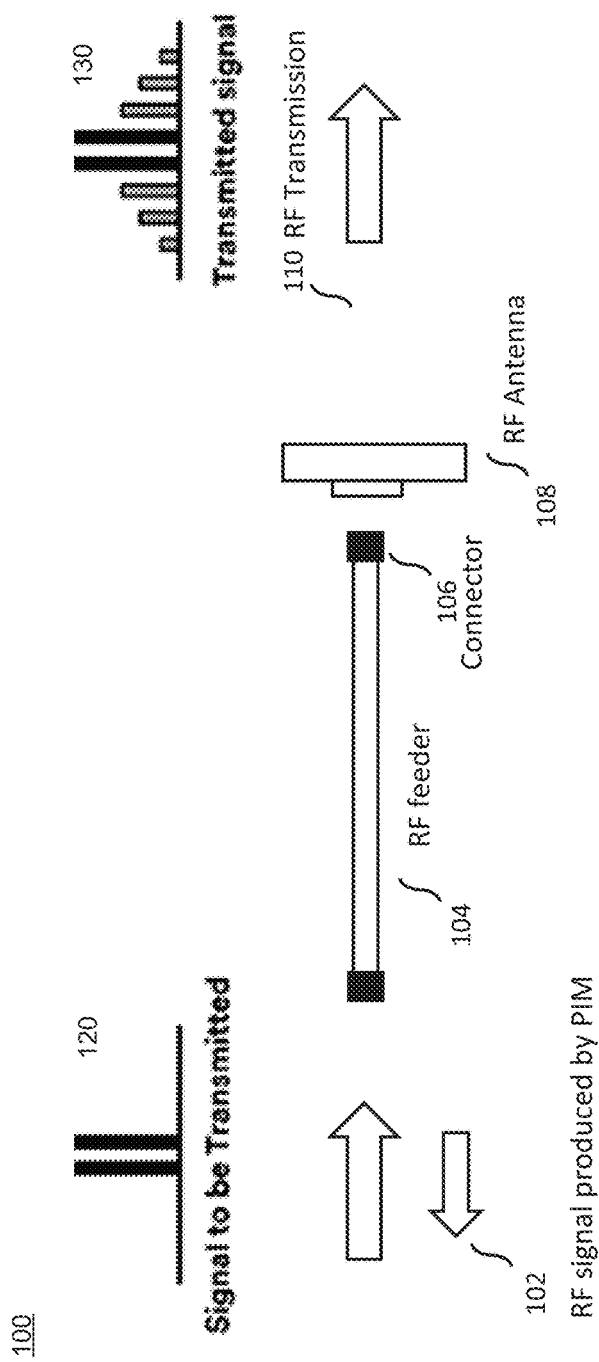
FIG. 1 illustrates an example visual representation of a transmitted signal that includes intermodulation products in the frequency domain due to physical layer defects.

FIG. 1 illustrates an example visual representation of a transmitted signal 110 that includes intermodulation products in the frequency domain due to physical layer defects in the transmission system 100. As represented in FIG. 1, PIM may occur in telecommunications equipment when two or more high power RF input signals encounter non-linear electrical junctions or materials, such as faulty RF Feeder (cable) 104, connector 106, or passive device port 108 in the RF path. PIM may, in some cases, result simply from two connecting bolts that are simply not tightened to the same torque range, even if the bolts are reasonably tight, rust free, and both cabling and bolts are high quality metal. Those non-linear junctions may cause generation of secondary signals 102 at certain mathematical combinations (such as 3rd order, 5th order) of the original RF inputs and referred as intermodulation products.

FIG. 1 shows the two RF input signals 120 in frequency domain received at the cellular site 100. By contrast, the transmitted signal 130 includes 3rd order, 5th order and 7th order intermodulation products produced by the two received RF input signals. The third-order intermodulation products, shown at the frequencies nearest to the transmitted input signals, may have relatively higher magnitude and fall closer to a downlink frequency band compared to higher order products (shown further away from the transmitted input signals). Such intermodulation products in the transmitted signal 130 may overlap the frequency spectra of uplink signals and cause interference, due in part due to intermodulation products typically occupying a wider band than the signals from which they are generated (i.e. 3rd order products from 10 MHz input signals may occupy 30 MHz bandwidth). It is also possible that more than one received input signal may fall within the spectrum occupied by the intermodulation products. When intermodulation products fall in a Wireless Network Operator's receive band, in other words Uplink Band (UL), they can increase the noise and interference within this band resulting with significantly reduced Cellular Site service area and degraded service quality and/or data rates.

In the context of the Open Systems Interconnection ("OSI") Model, PIM is a physical layer (OSI layer 1) problem, and most means of detecting PIM therefore focus on the physical layer using direct contact physical methods, such as a device that directly contacts hardware and sends a test single through such hardware. Because most sources of PIM (approximately two-thirds) are found in cables 104, and connectors 106, conventional PIM detection focuses on interacting with the physical radio base station site. Relationships between network performance and physical PIM ("How can we determine by looking at network performance that two bolts along cabling at a particular site are tightened to different newton-meters of torque?") appear to be overwhelmingly complex, or involve chaotic non-linearity, such that the idea of determining the relationship between the two is often dismissed out of hand.

As mentioned above, one of the conventional methods for PIM identification is through performing field tests on site. Those tests may be done using test equipment by transmitting high power test signals and detect the presence of PIM by tuning to frequencies at which intermodulation products of those signals will be expected by using a sensitive receiver. With this type of field-testing, the source of the PIM may be tracked down by field engineers and thus a part or condition causing the PIM may be replaced or fixed. This type of testing for passive intermodulation is typically intrusive as transmission of test signals disrupts the normal operation of the wireless network. Such testing also often relies on fieldwork and specific devices to measure PIM levels of Cellular Sites. Field testing can be time-intensive and costly, as skilled field teams are used to travel to each site with separate PIM test equipment for different bands. Testing can also involve climbing to towers or using man lift vehicles or bucket trucks to access certain parts of the system to be tested (such as antennas).

Other conventional methods used for PIM identification rely on creating a simulated artificial Downlink (DL) Load, typically referred as Air Interface Load Generator (AILG) or Orthogonal Channel Noise Source (OCNS). This simulated DL load can be used to estimate the effect of increased DL load on the Uplink (UL) Received Signal Strength Indicator (RSSI) measurements. This method compares the UL RSSI levels of a Cellular Site when it is unloaded and artificially loaded in the DL. A certain increase in UL RSSI with loaded DL transmission without measured user traffic may indicate intermodulation products generated in the system causing the UL RSSI elevation.

Air Interface Load Generation method requires load simulation test sessions to be scheduled for every Cellular Site. Test results would also be more reliable if it is performed when the Cellular Site user traffic is at its minimum (usually night hours) by enabling the comparison between lowest loaded conditions versus highest loaded condition simulation. Considering the presence of thousands of Cellular Sites of a Wireless Network Operator, to run such tests over the whole network is not practically possible, and would also be costly due to used time and resources. AILG is thus typically limited to only new launched sites acceptance testing or the sites that are listed as having problematic performance due to high UL RSSI.

In addition, on-site checking for PIM, necessitating sending teams to the site, bringing the site off-line, is hugely disruptive, especially in cases where PIM is not found, either due to the limitations of PIM testing, or simply because PIM is not the issue. Ideally on-site teams to check for PIM would only be sent to sites experiencing PIM, shifting the task of on-site teams to "check for PIM" to "find and fix PIM".

The systems and methods described herein demonstrate that, contrary to conventional approaches, PIM detection is possible without direct physical contact methods. Since PIM is a physical layer problem, direct information from the physical layer may be required, but this information can be obtained remotely. Combined with data (obtained remotely) from other layers in the OSI model, for example Key Performance Indicators (KPIs), and appropriate data processing, remote, non-intrusive detection of PIM may be performed. This has numerous advantages, primarily obviating the necessity for on-site teams to laboriously test for PIM using tools that may require the site go off-line. Such intrusive methodology generally ensures that teams will go to a site not to check for PIM, but to locate and fix PIM that is known to be there.

Figure 2:
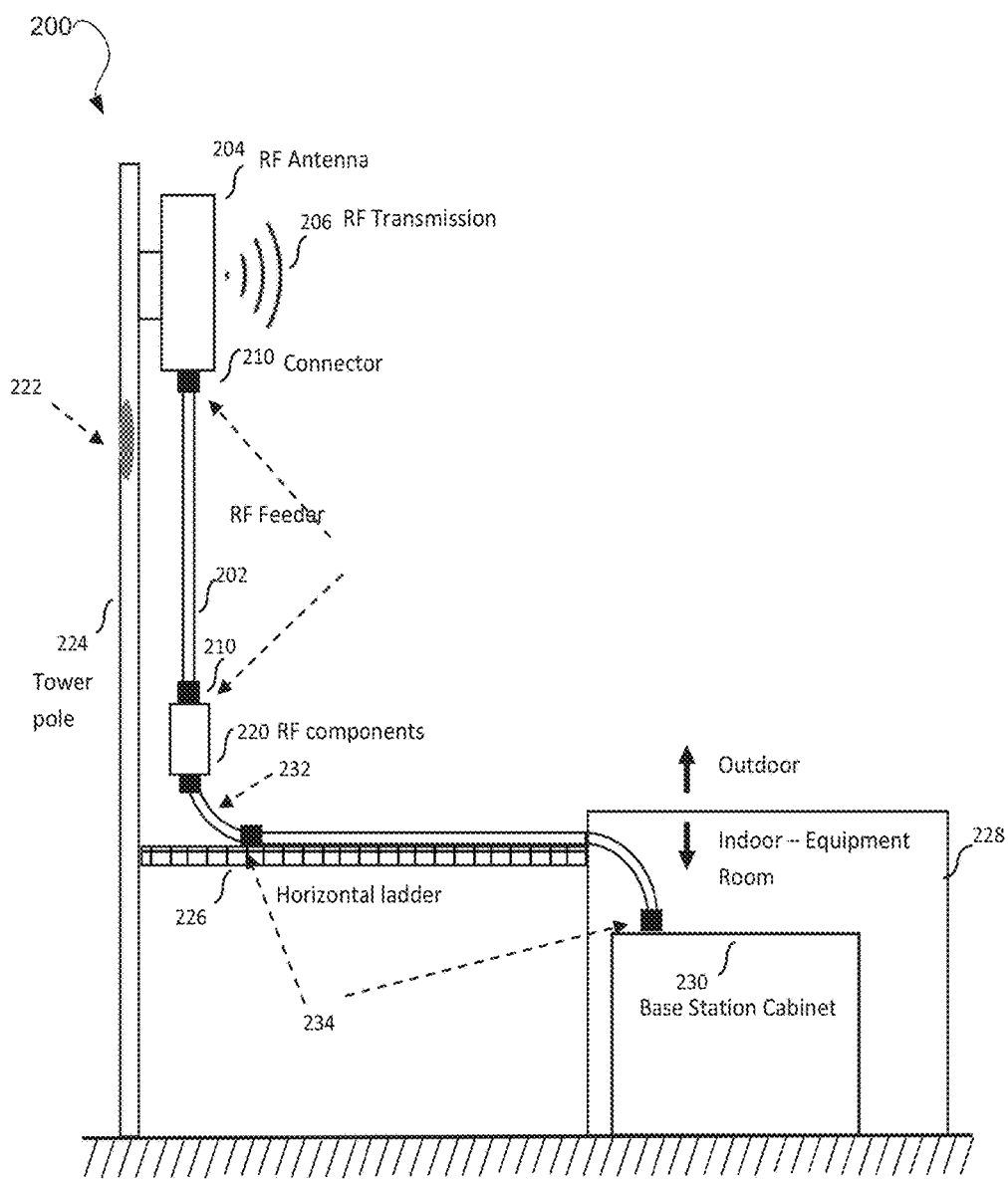
FIG. 2 illustrates an example visual representation of a radio base station displaying common sources of PIM.

In addition to the foregoing, a cellular site that passes a field PIM test or a simulated DL load test upon activation of the site does not mean it will stay free of PIM problems forever. FIG. 2 illustrates an example visual representation of a radio base station 200 displaying common sources of PIM. The exemplary radio base station 200 may include a tower pole 224, a horizontal ladder 226, and an RF antenna 204 broadcasting RF transmission 206. The cable 202 may lead to a base station cabinet 230, enclosed indoors within a structure 228. Due to external factors such as weather, climate impact or wind, vibration and regular reworks/site visits to Cellular Sites or activities or structural changes around the site antennas can cause issues. Such issues may include, for example, contaminated or oxidized RF surfaces and components such as cable 202 and/or RF components 220, dirty and/or excessively tight or loose connectors 210 and/or 234, metal flashing or rusty material 222 on a tower pole 224 in front of the antennas, and excessively bent cables 232. Such PIM issues usually grow gradually and may often be only recognized after the Site Performance KPIs (Key Performance Indicators) start to degrade significantly.

These types of PIM issues are often difficult to detect, even after potential PIM is suspected as indicated by poor KPIs such as downlink bit-rate. Testing may not show PIM for reasons of differing environmental stress. PIM may be present during times of heat or cold, or rapid thermal cycling, or ice loading, or wind loading. If the environmental conditions during the field test are not the same as when the performance loss (suggesting PIM) occurred, PIM can be difficult to find during field-testing. This difficulty occurs because PIM can be, and often is, not merely due to mismatched metal connections, for example, but by loose mechanical connections that are affected by environmental conditions. To satisfactorily find PIM in such cases, artificial mechanical stress would need to be applied to many components. Even then it is difficult to change the temperature of objects in order to match the conditions when performance suggested PIM. Such dynamic testing of each component is often impractical.

It is an object of the present disclosure to provide an efficient method to identify PIM issues on site without the need of arranging a field test or scheduling a Downlink Load Simulation test. In order to achieve this, there is provided a method using UL RSSI and other related Key Performance Indicator (KPI) statistics of radio base stations. It is further object of the disclosure to provide a concept for characterization and modeling of the UL RSSI values against traffic trends of cellular sites over a whole network or over cluster of sites that are categorized based on different aspects of cellular site features and properties. Those modeling methods can then be used to estimate the expected/determined UL RSSI values. Comparison of measured UL RSSI statistical data against those values along with the automated analysis of correlation between UL RSSI and KPIs that can affect UL RSSI is used to identify cellular sites that already have PIM issues, as well as cellular sites that have started to show early signs of PIM issues and/or external interference issues. Using the described data mining and processing techniques on statistical data may advantageously reduce the assessment and investigation times and operational costs of other conventional PIM testing methods.

Another benefit of the below-describe systems and methods is automated continuity of the PIM investigation, even after installation, with the addition and processing of new statistical data. The described analysis can be repeated and results can be refreshed by the addition of new Time (T) based Cellular Site statistical data to already existing historical data. One other benefit is to be able to predict the sites that are likely to have PIM issues in near future by detecting the early signs of PIM issues before they get to a degree of heavily degrading the network performance, which was not possible under conventional physical-layer testing for PIM.

The following description is not limited to detection of PIM, but can, in other embodiments, be configured to operate in a manner that allows a reduction of PIM. Although the correction of PIM (which in this context does not include attempted PIM suppression with estimated or simulated cancellation signals), being a physical layer problem may require manipulations and corrections at the physical level, it is nevertheless possible to ameliorate PIM.

Such a configuration is one in which the receiving information and data, such as KPI and RSSI measures from the network Operations and Support System (OSS), for example, is able to send commands to the network Operations Support System. These commands can be user initiated, wherein the method gives a suggested command to ameliorate detected PIM. Alternatively, in a closed loop configuration, the method can, if connected to an OSS, automatically send commands to the OSS without user intervention. Within a substantially short time frame, the method can check whether the sent commands lead to a decrease in PIM, and if not, a command to undo the change can be sent. The types of commands are described in the detailed description below.

In the following description, the following terminologies and abbreviations are utilized:

RSSI effecting Reference KPI (RERK) may describe a Cellular Site KPI that has direct or indirect impact on the UL RSSI trend of the site. Single RERK or multiple RERKs can be evaluated during the correlation and RSSI impact analysis.

Peak Hour (PH) may refer to a time increment where the maximum value of a specific KPI is reached (e.g., KPIs are measured hourly, Peak Hour would be shown as the hour (range between 00:00 and 23:00) where maximum value of the specific KPI is seen; smaller or larger time increments, such as 15 minutes, every 3 hours, etc, may be utilized in various embodiments).

Quiet Hour (QH) may refer to a time increment where the minimum value of the KPI is reached (e.g. if KPIs are measured hourly, quiet hour would be shown as the hour (range between 00:00 and 23:00) where minimum value of the specific KPI is seen; smaller or larger time increments, such as 15 minutes, every 3 hours, etc, may be utilized in various embodiments).

Delta RSSI may refer to the difference between the measured RSSI value of a cellular site coming from network statistics and the determined RSSI value of the same cellular site from the empirical formula for same time frame (e.g. same date or same hour of a given day, using whatever increment of time in which KPIs are measured).

The Stability Factor (SF) term may express the difference between the RERK value at its Peak Hour and its value at RSSI Peak Hour. If the difference is low, the KPI Stability Factor is high. If the difference is high, the KPI Stability Factor is low.

The Correlation Factor (CF) term describes the mathematical relationship between a RERK and the UL RSSI; any suitable expression for this relationship may be used, including a standard Pearson correlation coefficient between the RERK and UL RSSI, for example.

In the systems and methods discussed below, quiet hours and peak hours of the radio base station KPI statistics are used to reflect the loaded and unloaded conditions of the station. Conventionally, comparison between the loaded and unloaded status of a site requires specific artificial load testing, where load simulation sessions are scheduled for every site separately and at certain time frames. The described systems and methods remove this necessity, by using the statistical data of RSSI and RERKs. Also, with automated processing and detection of the delta changes (value difference with respect to earlier time periods) not caused by the normal traffic load of the site, not just existing PIM problems but also early symptoms of growing PIM issues can be detected before they create a significant degradation on performance KPIs.

Figure 3:
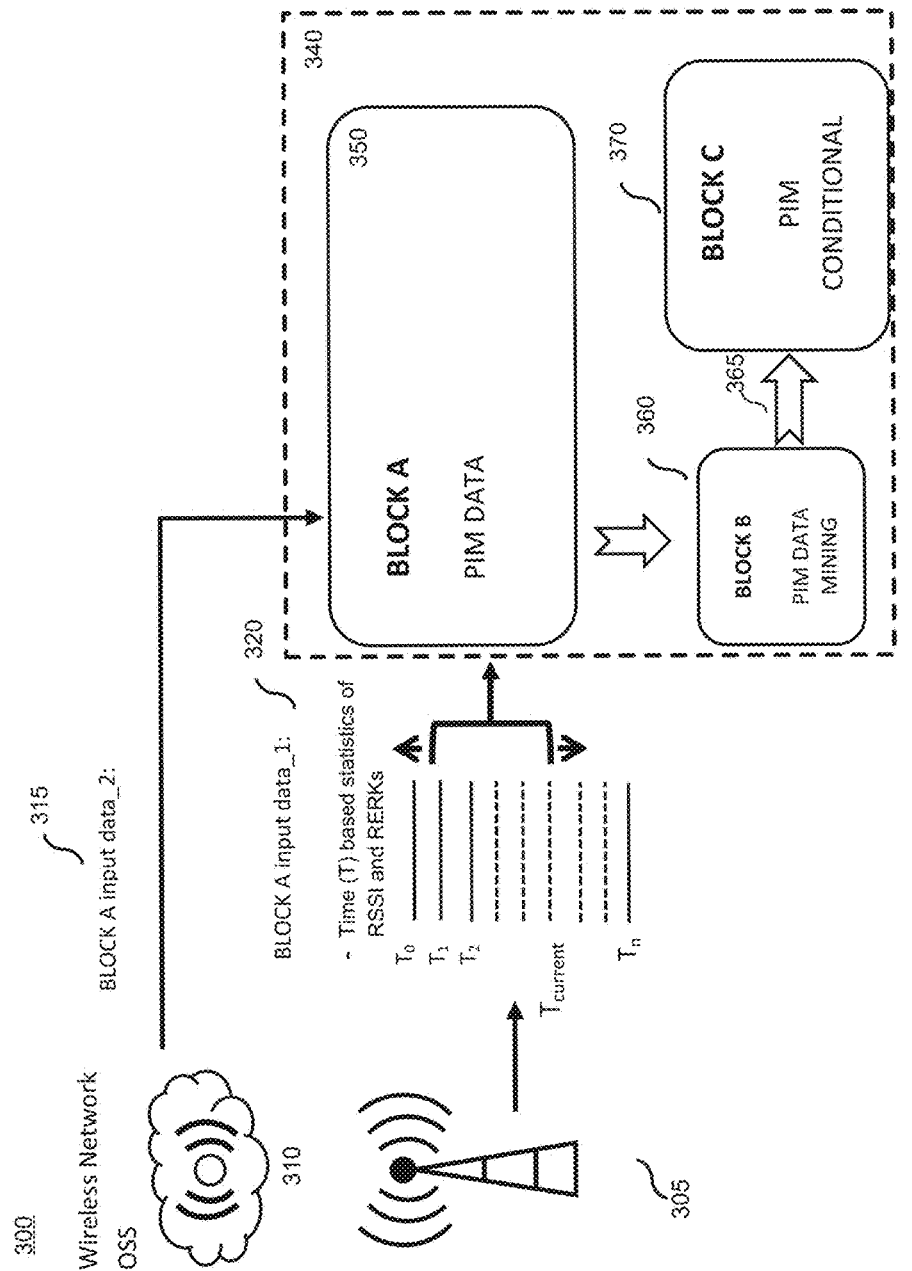
FIG. 3 is a diagram of an example environment for detecting potential PIM problems with a radio base station in accordance with some embodiments.

FIG. 3 is a diagram of an example environment 300 for detecting potential PIM problems with a radio base station in accordance with some embodiments. Environment 300 shows a database server 340 with external entities wireless network operator 310 and identified radio base station 305. The database server 340 may be communicatively coupled to each of the wireless network OSS 310 and the identified radio base station 305 via a network connection. In some embodiments, the database server 340 may only be coupled to the wireless network OSS 310, which may provide the database server 340 with KPIs for the identified radio base station 305. The wireless network OSS 310 may facilitate radio access functionalities for network users. In a network managed by the wireless network OSS 310, there may be hundreds of radio base stations ("RBSs") distributed in the network area, a group from which the identified radio base station 305 is selected for analysis. The identified radio base station node 305 may belong to a wireless communication network managed by the wireless network OSS 310, and may provide radio access functionalities for network users.

As shown in database server 340, three separate modules may be utilized for detection of potential PIM problems. First, PIM Data Collection module 350 receives KPI data 315 from wireless network operator 310 and KPI data 320 from the identified radio base station 305. KPI data 315 may include historical KPI data from a plurality of radio base stations managed by wireless network operator 310. KPI data 320, as shown in FIG. 3, may include time-based statistics for uplink RSSI and KPIs for the identified radio base station 305, over a set of time intervals T over a predetermined period of time.

As stated above, the time intervals may be any user-specified interval time period. The shorter the time interval is in which KPIs are measured, the better resolution RSSI-affecting KPI behavior will have. For example, 15 minute-incremented KPI statistics will provide a better understanding of KPI behavior compared to daily-incremented results. Also, a better understanding of network RSSI and traffic trends may be obtained as the predetermined period of time which the statistics are collected over is longer. For example, two weeks of statistics will provide a better understanding of RSSI-affecting KPI behavior compared to three days of statistics.

Statistics may cover a certain period of time as selected by the user starting at a time in the past i.e "$T_0$" until a current time ($T_{current}$), as shown in FIG. 3. New statistical data may be constantly generated in the wireless network, and with the new added statistical information, the overall process of current method can be either re-triggered by the user or automatically refreshed, in various embodiments.

A second module used for PIM problem detection and analysis may be PIM Data Mining module 360, which may receive the PIM Data Collection module 350 and identify RERKS from the received KPIs based stability factors and correlation factors determined for each KPI. Once RERKs have been identified, PIM Conditional Analysis module 370 may be used to determine a delta RSSI difference for the identified radio base station 305 between measured UL RSSI and an estimated UL RSSI, and make a recommendation regarding the presence of PIM. The operation of modules 360 and 370 is elaborated further below, in the accompanying text to FIGS. 4, 5, and 7.

Figure 4:
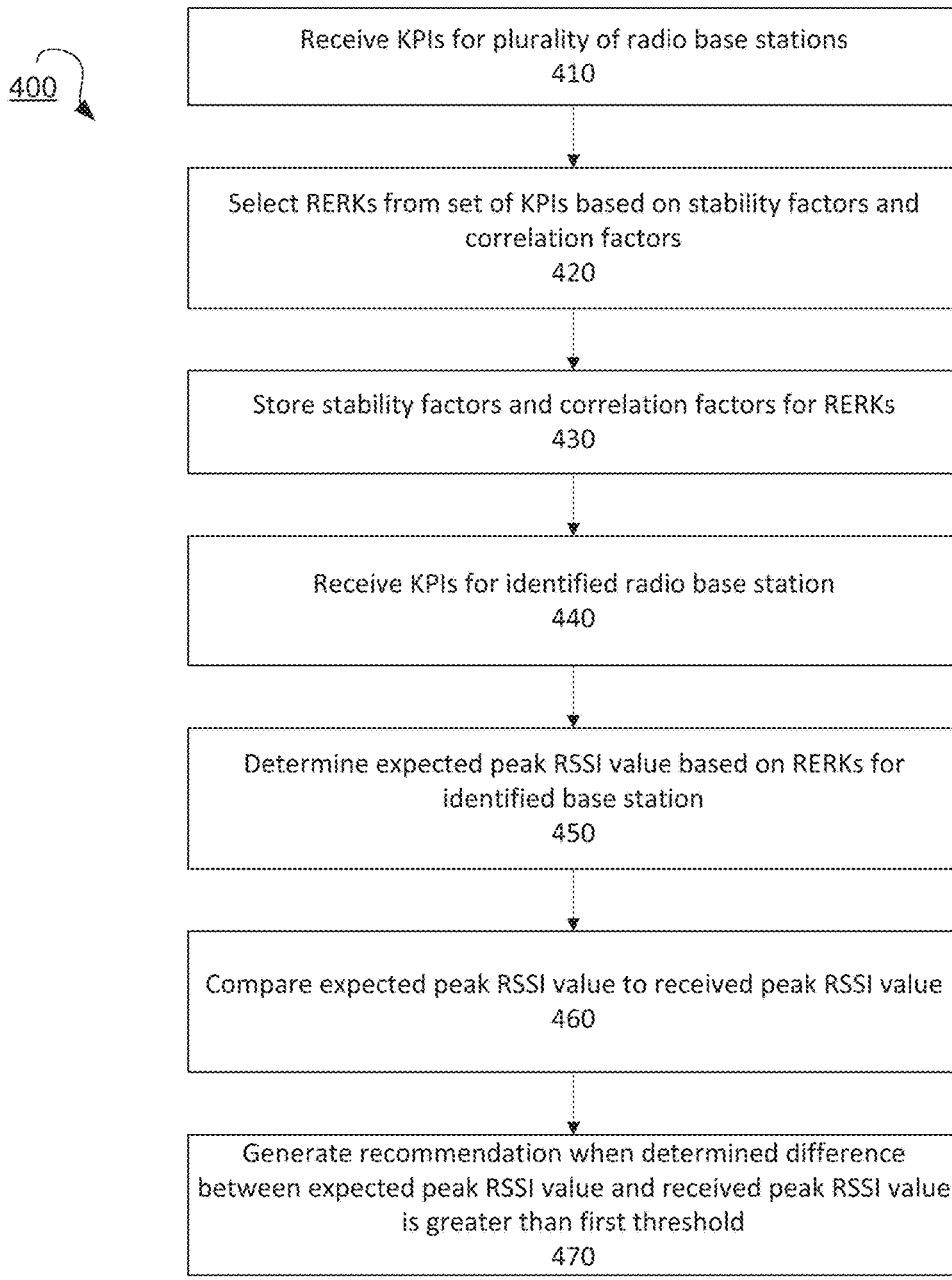
FIG. 4 illustrates an exemplary embodiment of a method for detecting potential PIM problems with an identified radio base station.

FIG. 4 illustrates an exemplary embodiment of a method 400 for detecting potential PIM problems with an identified radio base station. Method 400 may be executed by database server 340, for example, and serves as a general overview of the process used to identify and analyze potential PIM problems with the identified radio base station. As described above, a set of key performance indicators (KPIs) over a predetermined period of time for a plurality of radio base stations are received by a database server over a network connection at step 410. Stability factors and correlation factors for each KPI of the set of KPIs are determined based on the received KPIs. The database server may then select KPIs to be RSSI Effecting Reference KPIs (RERKs) based on a comparison of the stability factors and the correlation factors for the set of KPIs at step 420. The details of the calculations are discussed below, in the discussion of FIG. 5. The determined stability factors and the determined correlation factors for the selected RERKs may be stored by the database server at step 430, in a memory of the database server, for example.

At step 440, the database server may receive KPIs for an identified radio base station, the KPIs including RSSI values and RERK values for the identified radio base station. Based on RERK values for the identified radio base station at a peak RSSI value time for the identified radio base station and the determined correlation factors for the selected RERKs, the database server may determine an expected peak RSSI value at step 450. Optionally, at step 450 an expected quiet RSSI value may also be determined, based on RERK values for the identified radio base station at a quiet RSSI value time for the radio base station and the determined correlation factors for the selected RERKs. The expected quiet RSSI value may be useful in determining if external interference, in addition/alternatively to PIM, is affecting the identified radio base station in some embodiments.

A difference may then be determined between the determined expected peak RSSI value for the identified radio base station and a peak RSSI value measured at the peak RSSI value time for the identified radio base station at step 460. This difference, also referred to herein as "delta RSSI value," may be produced for both Peak Hour and Quiet Hour where delta is the difference between the measured RSSI value of a cellular site obtained from network statistics and the expected RSSI value of the same cellular site for same time frame (i.e. same date or same hour of a given day).

The difference may then be compared to various thresholds as a part of conditional analysis, as seen in module 370 of FIG. 3. Those thresholds are based on the below explained criteria (with respect to the discussion in FIG. 7) and comparison results may indicate the root cause of the problem on cellular sites with UL RSSI issues such as if it is a PIM-related issue (first threshold) or Early Signs of PIM Problems (second threshold) or External Interference (third threshold) issues. When the determined difference between the determined expected peak RSSI value for the identified radio base station and a peak RSSI value measured at the peak RSSI value time for the identified radio base station exceeds a first threshold, a recommendation to a user that the identified radio base station be investigated for passive intermodulation problems may be generated at step 470. The determined difference may, in some embodiments, be further based on the determined stability factors for the selected RERKs, in addition to the correlation factor and the RERK values. This means that if there is a high delta RSSI between the measured Peak Hour RSSI value and the determined Peak Hour RSSI value, high Correlation Factor between RSSI and the RERK values and a high RERK Stability Factor, this indicates a PIM Problem on the cellular site. The higher the value of the difference, the higher the probability of PIM issue. Other thresholds are discussed below, in the text accompanying FIG. 7.

As a result of the analysis and described operation of the presented system and method, it is possible to pinpoint the PIM problems of sites with high probability for the entire network. With the capability of automated repetitions of the process with every new time based statistical data added, existing PIM problems or the early signs of PIM issues building up can be monitored and reported on cellular sites without relying on field visits or site work via custom equipment.

Figure 5:
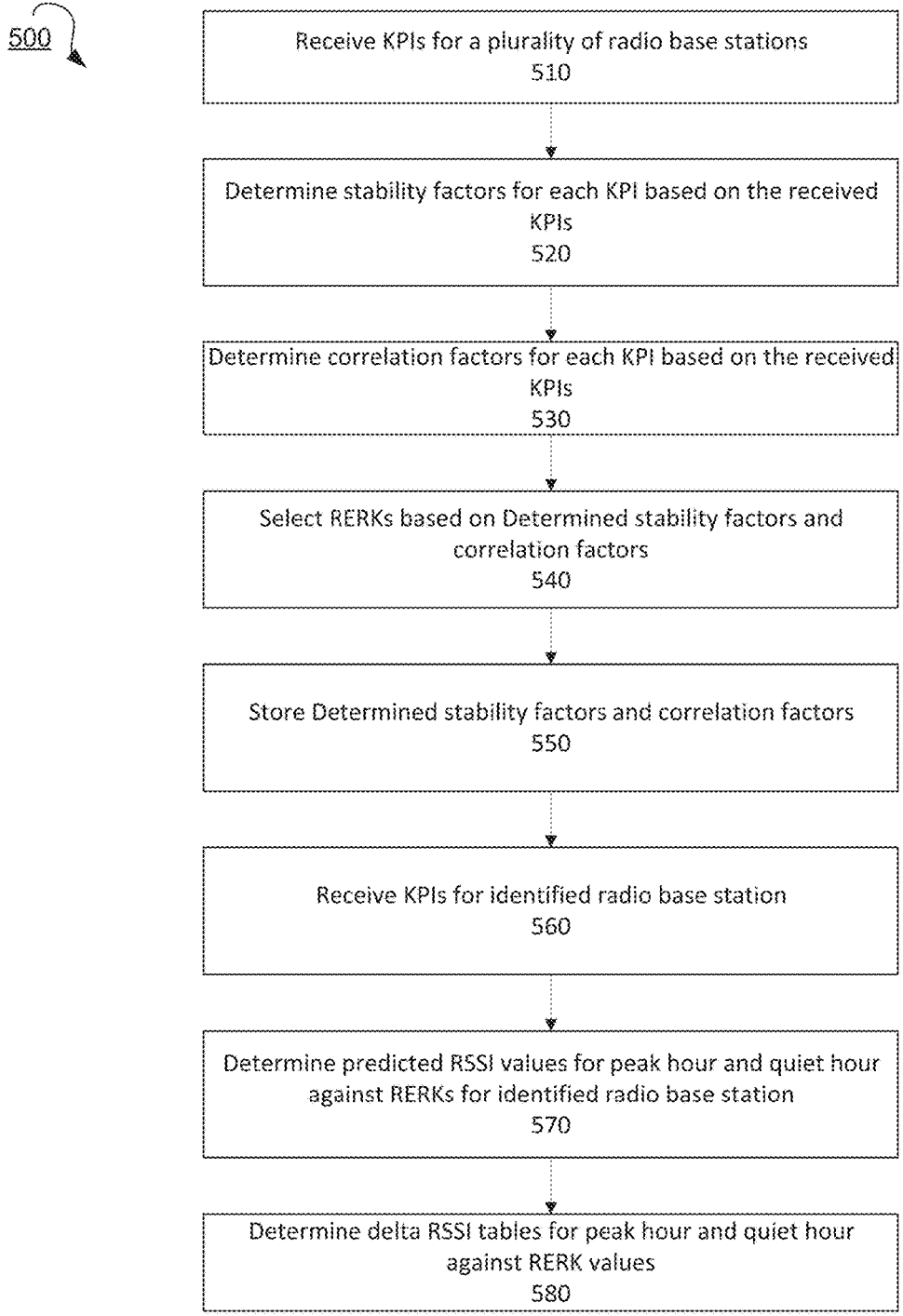
FIG. 5 illustrates an exemplary flow diagram for a method of data mining received KPIs to identify RERKs, stability factors, and correlation factors in an exemplary embodiment.

FIG. 5 illustrates an exemplary flow diagram for a method 500 of data mining received KPIs to identify RERKs, stability factors, and correlation factors in an exemplary embodiment. Method 500 provides a more detailed explanation of how steps 420-460 of method 400, in an embodiment, determine delta RSSI for comparison with the thresholds discussed above.

As described above, a set of key performance indicators (KPIs) over a predetermined period of time for a plurality of radio base stations are received by a database server over a network connection at step 510. Once the input data is collected from network KPI statistics and cellular site information, PIM Data mining can start either for all of the plurality of radio base stations managed by the wireless network OSS, or for an optional cell categorization within the plurality of radio base stations (or cluster), where statistical data is grouped over specifically defined cell clusters. Clusters may be defined by grouping cell sites based on one or more characteristics that would cause a difference in terms of UL RSSI or traffic trending behavior, such as carrier frequency/band (e.g. low band 700 MHz cells, mid band 1800 MHz cells, high band 2300 MHz cells), antenna height (e.g. low sites <12 m, high sites 12 to 30 m, high rise >30 m), User traffic (Population) distribution, clutter type (e.g. dense urban, urban, rural), geographical layout (e.g. flat terrain sites, hilly terrain sites, and/or seaside sites).

From the received set of KPIs for the plurality of radio base stations, stability factors are determined for each KPI of the set of KPIs, the stability factors being defined as a difference between an approximate peak time value of each KPI and a value of each KPI at a received signal strength indicator (RSSI) peak time at step 520. The stability factors may be determined based on the received KPIs over the predetermined period of time. The database server may also determine correlation factors for each KPI of the set of KPIs, the correlation factors being defined as how closely changes in the RSSI affect values of each KPI at step 530. The correlation factors may also be determined based on the received KPIs over the predetermined period of time.

Stability factors and correlation factors of the various KPIs may be used to identify RERKs, which are KPIs that are linked to the RSSI performance of a radio base station. Certain KPIs correlate to RSSI performance. For example, downlink transmit power (DL TX power) for an LTE cell site can be low or high, dependent on the area that cell services, and the amount of user traffic—the number of User Equipment (UEs) connected, and the amount of services/data they are using. Similarly the received signal strength (RSSI) by the cell (Upload RSSI), in normal conditions, would vary. In cases where there is a lot of traffic, the RSSI would be high. In cases with no traffic, the RSSI would be around thermal noise for LTE.

Therefore, correlations between physical layer measures (such as UL RSSI) with abstract data layer KPIs can be found. The degree to which a KPI tracks with the UL RSSI may be determined as the correlation factor of that KPI. However, correlation indicates that two variables are moving in a similar direction at similar times, but not the precise divergence of those variables.

To quantify the divergence between a KPI and RSSI, peak hour (highest value) and quiet hour (lowest value) of both UL RSSI and the KPI are determined, and a difference between UL RSSI and RERKs for both peak and quiet hours is determined, known as the stability factor for the KPI. It should be noted that the term "hour" in peak hour and quiet hour is an arbitrary measure; it is the measure over a defined time interval, and may refer to an interval that is less than an hour or greater than an hour in various embodiments. If the difference between the value of a KPI at the hour of KPI peak, and the value of KPI at the hour of UL RSSI peak is low, this indicates that that particular KPI is highly stable with respect to RSSI, and is a candidate to be a RERK used for analysis to identify PIM/External interference issues.

Figure 6A:
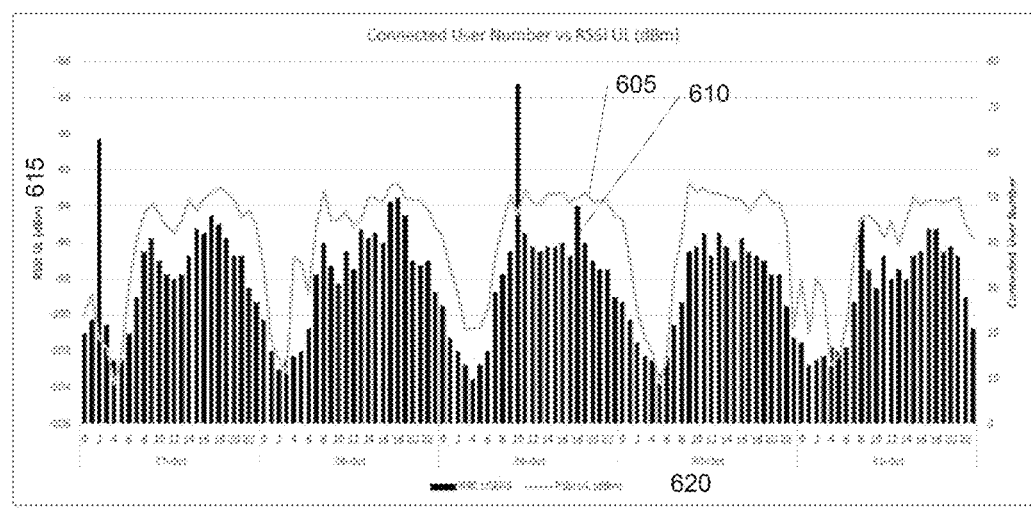
FIGS. 6A-B illustrate hourly statistical charts between different RERKs and uplink RSSI in various embodiments.
Figure 6B:
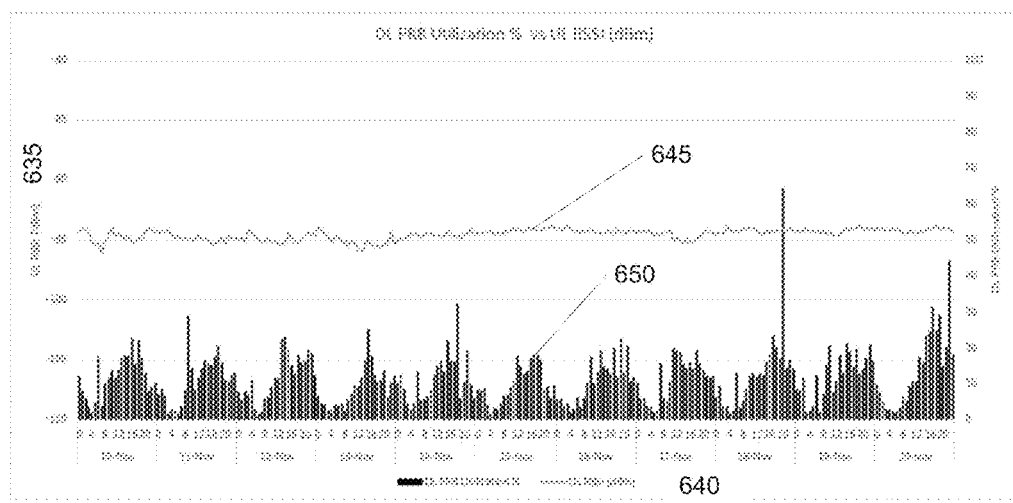

The database server may select KPIs to be RSSI Effecting Reference KPIs (RERKs) based on a comparison of the stability factors and the correlation factors for the set of KPIs at step 540. For example, KPIs may be selected as RERKs only if there is strong correlation with UL RSSI and if the KPI has high stability with respect to UL RSSI. FIGS. 6A-B illustrate hourly statistical charts between different RERKs and uplink (UL) RSSI in various embodiments. Chart 600 of FIG. 6A illustrates the KPI connected user number 610, over time incremented in hours 620, against UL RSSI 605 over the same time period, measured in decibel-milliwatts 615 over the same time frame. The data in table 600 may be obtained from the wireless network OSS 310, and may be an average of a plurality of radio base stations managed by the wireless network OSS. As the peak hours substantially coincide between UL RSSI values 605 and connected user number KPI values 610 over the same time period, there is clearly a strong correlation factor between UL RSSI and connected user number KPI for the radio base stations shown. Also, because the peaks of the connected user number KPI values 610 during the peak hours and the quiet hours are substantially set at the same value range, the connected user number KPI values 610 exhibit high stability factor with respect to the UL RSSI values 605 at the same time period. Accordingly, the connected user number is a strong candidate for selection as a RERK.

By contrast, chart 630 shown in FIG. 6B shows Downlink Physical Resource Block Utilization (DL PRB Utilization, measured as a percentage) KPI values 650 that display little correlation with UL RSSI values 645 (measured in decibel-milliwatts 635) over the same time intervals 640. Because the correlation factor would be small, the DL PRB Utilization would likely not be selected as a RERK for the identified radio base station. It should be noted that, because UL RSSI is always high, even when traffic (quiet hours) is low for the radio base stations analyzed for chart 630, the antennas are receiving significant signal strength that is not being used. Therefore, it is likely that a radio signal is impinging on the antenna from external sources, as DL PRB Utilization may often correlate strongly with UL RSSI, and be selected as a RERK.

RERKs may be selected every time a radio base station is analyzed, as described in method 500, or may be selected for clusters of radio base stations having similar site behavior (e.g., similarly strong correlation and stability factors for the selected RERKs). Any KPIs with high correlation factor and stability factor with respect to UL RSSI may be selected as RERKS. While the list is not limiting, other RERKs that may be selected include:

Download Physical Resource Block Utilization, measured as percentage (DL PRB). An indicator of how much band spectrum is utilized. In optimal conditions, this correlates with Download Transmit Power (DL TX power).

Similarly Upload Physical Resource Block Utilization (UL PRB) measured, as a percentage is an indicator of how much upload band spectrum is utilized. The more traffic (and UEs connected) the higher UL PRB utilization.

Connected User Number: The number of connected users (UEs) to a cell site, as measured over a defined time period. This can be an average over a timeframe or a number based on the finest granularity timeframe measure possible. Peak hours=more connected users (UEs).

Radio Connection Attempts: The number of connection attempts. Peak hour, high traffic=more connection attempts.

Upload Hybrid Automatic Repeat Request success, measured as percentage (UL HARQ) measures retrieved data packet percentage. If there were issues, such as PIM or external interference, this measure would be adversely affected; there would be more Repeat Requests.

User Equipment Transmit Power Limited: A measure of samples where the required transmit power exceeds the power limits of the User Equipment (e.g., phone, tablet). The device has not enough transmit power to be "heard" by the cell, more likely as the overall UL RSSI increases.

Returning to FIG. 5, the determined stability factors and the determined correlation factors for the selected RERKs may be stored by the database server (e.g., in a table, or any suitable data structure) at step 550. The database server may receive KPIs for an identified radio base station at step 560, the KPIs including RSSI values and RERK values for the identified radio base station. The KPIs for the identified radio base station may be received at the same time as the set of KPIs for the plurality of radio base stations from step 510, or at any time before or after the set of KPIs is received.

The values of the received RERKs may be evaluated and the RSSI quiet times and peak times may be identified, along with corresponding RERK values at those times. Based on received RERK values for the identified radio base station at a peak RSSI value time for the identified radio base station and the determined correlation factors for the selected RERKs, the database server may determine an expected peak RSSI value at step 570, for use in detecting potential PIM problems. Also at step 570, an expected quiet RSSI value may be determined to detect the presence of potential external interference, in addition to detecting potential PIM problems.

To determine the expected values for peak RSSI and quiet RSSI, a mathematical model may be used that receives the peak and quiet values for the selected RERKs as inputs. Any suitable modeling method may be used. For example, modeling the RSSI vs RERK relation and determining the expected RSSI may be performed using polynomial regression analysis in an exemplary embodiment. Between two or more variables having a certain correlation, a modeling can be characterized by creating an empirical formula based on polynomial functions. Polynomial functions can have different degrees such as degree zero (constant), degree one (Linear), degree two (quadratic), degree three (cubic) etc. An advantage of using polynomial models is that they may have a simple form, well-known and understood properties, and may be computationally easy to use.

The delta RSSI may then be determined between the expected peak and quiet RSSI values and the received, measured RSSI values for the identified radio base station. In an embodiment, the delta RSSI values may stored in tables for the peak hour and the quiet hour for the identified radio base station at step 580. For example, a difference may then be determined between the determined expected peak RSSI value for the identified radio base station and a peak RSSI value measured at the peak RSSI value time for the identified radio base station to obtain the delta RSSI for the RSSI peak hour. Based on the difference, a recommendation may be generated if the delta RSSI for the RSSI peak hour exceeds the first threshold, as described above in FIG. 4.

Figure 7:
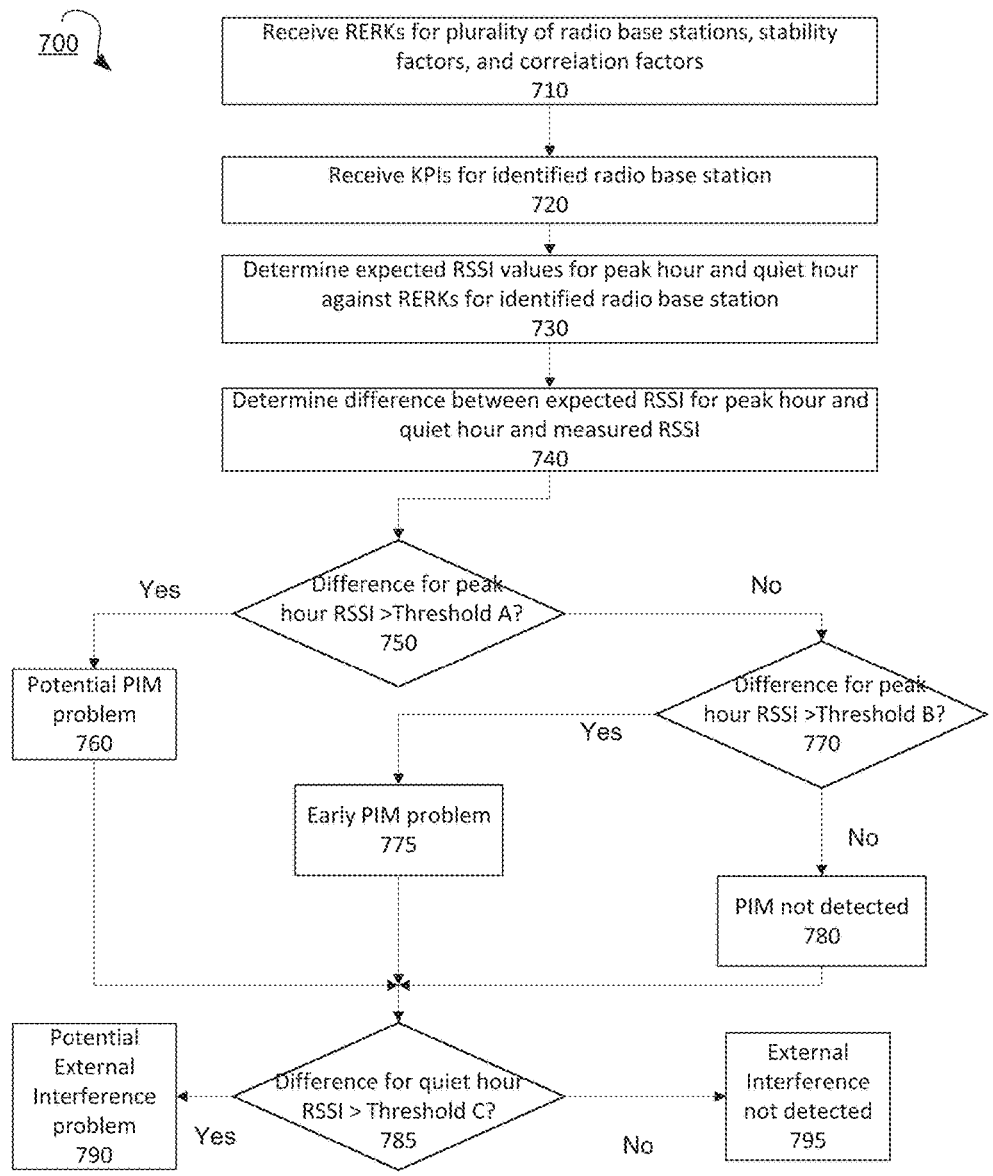
FIG. 7 illustrates an exemplary flow diagram for a method of analyzing received KPIs for an identified base station to determine if potential PIM problems are present in an exemplary embodiment.

Once delta RSSI has been determined for RSSI peak hour and RSSI quiet hour for the identified radio base station, analysis may be used to identify potential PIM problems. FIG. 7 illustrates an exemplary flow diagram for a method 700 of analyzing received KPIs for an identified base station to determine if potential PIM problems are present in an exemplary embodiment. Steps 710-740 summarize the PIM data mining steps discussed in greater detail above, with respect to FIG. 5.

At step 750, the delta RSSI for the peak RSSI hour is compared to a first threshold, threshold A. When the determined difference between the determined expected peak RSSI value for the identified radio base station and a peak RSSI value measured at the peak RSSI value time for the identified radio base station exceeds the first threshold, a recommendation to a user that the identified radio base station be investigated for passive intermodulation problems may be generated at step 760. The determined difference may, in some embodiments, be further based on the determined stability factors for the selected RERKs, in addition to the correlation factor and the RERK values. This could be as simple as: Delta RSSI multiplied by Correlation value multiplied by Stability Factor, in some embodiments. If there is a high delta RSSI between the measured Peak Hour RSSI value and the determined Peak Hour RSSI value, high Correlation Factor between RSSI and the RERK values and a high RERK Stability Factor, this may indicate a PIM Problem on the cellular site. The higher the value of the difference, the higher the probability of PIM issue, in some embodiments.

When the delta RSSI for the peak RSSI hour is less than threshold A, a second comparison is made at block 770. Where the difference at the peak RSSI hour is less than Threshold A but greater than a Threshold B, it may mean that delta RSSI is not high enough to indicate a strong PIM problem but based on existing Correlation Factors (and/or Stability Factors) and the peak delta RSSI values, cellular site shows the early signs of a PIM issue growing and if not addressed, it may reach to a level degrading the cellular site performance in the future. Accordingly a recommendation is generated that there may be an early PIM problem at step 775. If the difference at the peak RSSI hour is less than threshold B, then no potential PIM problem is detected at step 780.

If, in the absence of traffic, RSSI levels are high, or to a significant degree above thermal noise, then there may be external interference impinging on the UL band. Examples include UE (phones, tablets, e.g.) that are broadcasting and leaking into the UL band but are not serviced by the network. This is common because there are many differing and competing LTE networks. Other transmitters in the area can also contribute to external interference, as can deliberate jamming signals, frequency harmonics, and metal surfaces close to the cell's antenna, to name a few. Accordingly, the quiet hour delta RSSI is compared to threshold C at block 785. If the difference is above a given Threshold C, meaning that there is high delta RSSI between the measured Quiet Hour RSSI value and the determined Quiet Hour RSSI value, and low correlation between RSSI and the RERK, it indicates an external interference presence on site. A recommendation of a potential external interference problem is accordingly generated at step 790. If the quiet hour delta RSSI is less than threshold C, then no external interference problem is indicated at step 795.

The threshold A, B, and C may be set to user-specified predetermined values. The values for the delta RSSI thresholds may be set depend on the network, its density, the number of users, the environment—whether urban or rural, e.g.—and will be determined both empirically and statistically and as the user choses, given business reasons, as there are acceptable thresholds of error, of PIM, in networks, where a cost-performance-downtime actuarial analysis renders such minor problems acceptable in the long run.

Threshold A, beyond which if the weighted delta RSSI (from the PIM Peak hour function, which is based on a "raw" delta RSSI value") exceeds this value, the user determines that that value has increased enough without concomitant increase in RERK to warrant suspected PIM, and further investigation, which may include an on-site team to intrusively search for the source of PIM, downtime of the cell, etc.

Threshold B, beyond which if the weighted delta RSSI (from PIM Peak hour function) exceeds this value, but does not exceed value "A", the user concludes that it is not, in a business costing sense, to either send an on-site team to the cell or shut down the identified radio base station. Furthermore, threshold C, beyond which if the weighted delta RSSI (from PIM Quiet hour function) exceeds this value, and since if exceeding this value at Quiet hour there is little correlation between RSSI and RERK, this likely suggests External Interference.

However, the description is not limited to requiring these thresholds. The method could determine (daily, weekly, hourly, e.g.,) these PIM functions and produce a chart which may indicate, for example, a trend upwards of the output value of PIM Peak hour function) that would suggest that—no hard threshold required—the cell site is trending in the wrong direction, and that PIM is getting worse. There is no need for hard thresholds. It is likely that the user, given business/cost and other non-technical reasons would eventually chose their own thresholds for "A", "B", and "C", but in the meantime the method can show how cells performance is either stable, or trending in the wrong direction with respect to PIM and External Interference.

Alternatively to the foregoing, the generating the recommendation to the user may place only after the determined difference exceeds the first threshold for a plurality of observed RSSI peak times for the identified radio base station, thereby forming a trend. Relying on trends, rather than reacting to a first observed difference greater than the threshold, may reduce the risk of a false positive test, which could lead to unnecessary physical layer testing of an identified radio base station.

Figure 8:
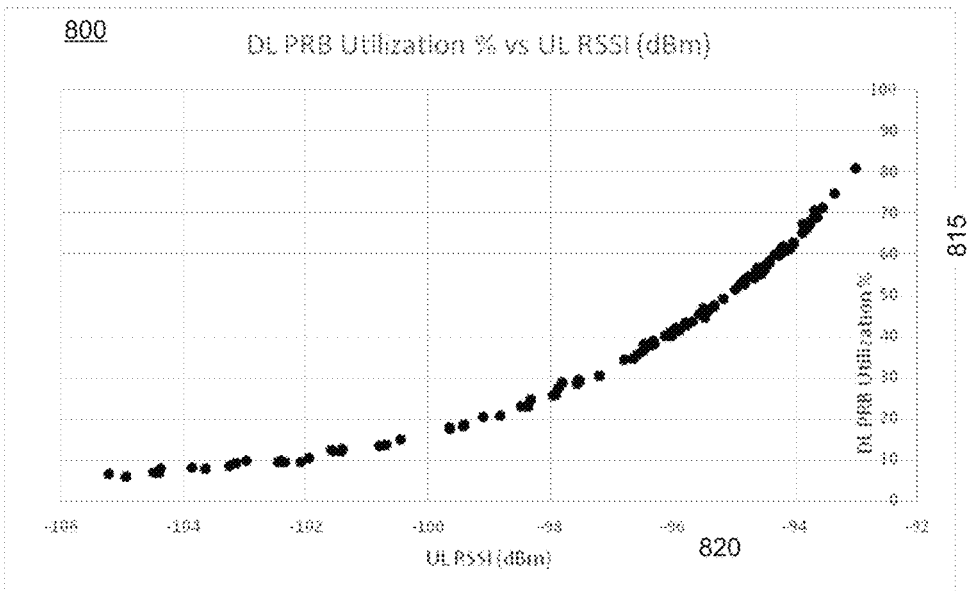
FIG. 8 illustrates a scatter chart depicting the behavior between a RERK and RSSI in an exemplary embodiment where a radio base station is affected by a potential PIM problem.

FIG. 8 illustrates a scatter chart 800 depicting the behavior between a RERK and RSSI in an exemplary embodiment where a radio base station is affected by a potential PIM problem. In chart 800, there is clear correlation between UL RSSI 820 (measured in dBm) and the RERK DL PRB 815 (Downlink Physical Resource Block Utilization, measured as a percentage). Therefore, as UL RSSI—power received at the antenna—increases, the amount of data downloaded also increases that would necessitate increase in download power transmission (DL TX power). But note that there is a strong (potentially abnormal) increase in UL RSSI when there is an increase in DL PRB utilization. This trend, gathered over a plurality of time intervals, suggests PIM for the correlation is present. The trend shown in chart 800 is a stronger indication of presence of PIM than merely one peak hour showing that the measured RSSI has a difference from the estimated RSSI greater than threshold A.

Figure 9:
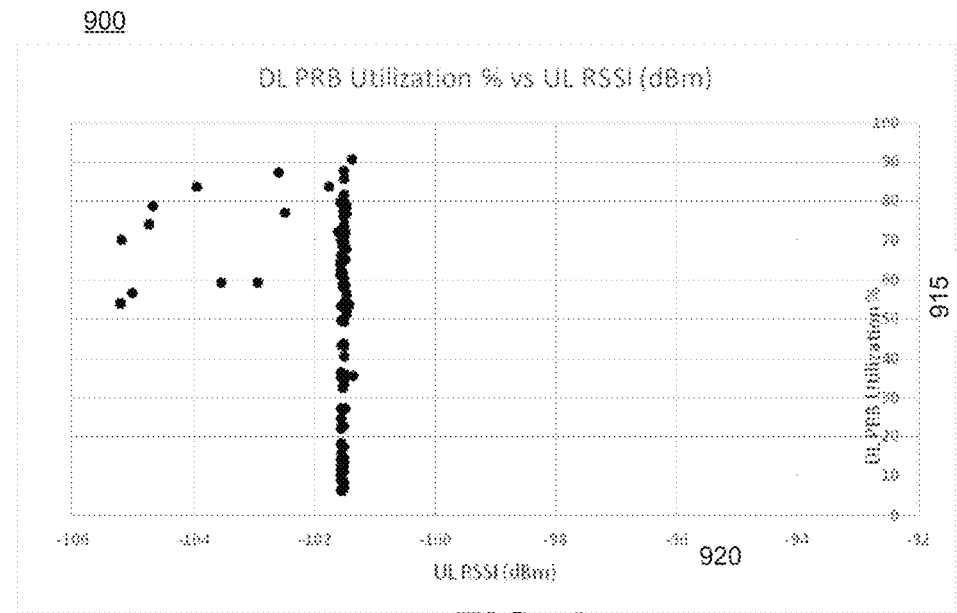
FIG. 9 illustrates a scatter chart depicting the behavior between a RERK and RSSI in an exemplary embodiment where a radio base station is affected by a potential external interference problem.

FIG. 9 illustrates a scatter chart 900 depicting the behavior between a RERK and RSSI in an exemplary embodiment where a radio base station is affected by a potential external interference problem. As seen in chart 900, there is low correlation between UL RSSI 920 and, DL PRB 915. Therefore, without correlation between DL PRB and UL RSSI, it is likely that external interference impinging on the UL band is the cause, as discussed above.

There are extended use cases and extended configurations of the present description, which is not restricted to operating in such a "detect-only" manner. If connected to the network OSS in a manner that allows the system to send commands to the OSS (at the discretion of the network user) in an "active" manner, and also the possibility to issue automated commands in a "closed loop" manner without user intervention.

For example, were it determined that PIM (or external interference) problems exist at a particular site the system may signal the user to, (or automatically perform the task to) for example, reduce the actual power signal from an antenna, (in the knowledge that, for example, a 1 dB reduction can lead to a 2-3 dB reduction in PIM.) This can ameliorate PIM problems until such time as an on-site fix is performed. If an antenna (or array) is on motorized gimbals or supports controllable from the OSS, the system may signal the user to alter the angle or inclination of the antenna. This may be useful both in cases of PIM and external interference.

Such suggested parameter changes are stored and associated with the measures—the criterion or criteria—that were used to trigger the PIM warning. In addition, these are linked to the future behavior of the problematic site. In this manner, the system can view the success or lack thereof of the automated parameter changes. Such a feedback loop allows the system to improve these automated parameter changes over time.

The above-described method thus associates methods where measurements trigger PIM/External interference criteria, automated parameter changes in an attempt to ameliorate potential problems, and noting post-amelioration changes (varying time windows) to determine success or failure. In addition to the continuous updating of the PIM/External interference trigger criteria, the above forms an addition set of criteria: whether to engage automated parameter updates.

The thresholds for the criteria for a specific suggested (or automated closed loop) action, can be updated determined by measurements before and after each instance of that action. As well as the action either having a beneficial effect or not (in which case an automated action reverses the previous one), with the updating of the criteria upon which automated parameter changes are made, the methods described herein not only refine and improve the accuracy of PIM prediction, both lowering false positives (false negatives are a different issue and are dealt with below), but improve the refinement and degree to which it can ameliorate PIM via automated actions.

The refinement of automated parameter changes in closed loop mode allows a doubling of the broad categories of PIM (or external interference) that the system outputs:

- PIM detected, automatic amelioration possible: on-site fix less time critical;
- PIM detected, automatic amelioration not possible: suggest immediate physical layer on-side fix;
- External Interference detected, amelioration not possible: immediate on-site fix;
- External Interference detected, amelioration possible: on-site fix lower priority.

Take an example of two cases of PIM affecting two nodes in a network. Node 1 is experiencing severe PIM seriously impacting network traffic, while Node 2 is experiencing moderate PIM which is merely slowing network traffic, but not interrupting the network customer severely. The priority would normally be that the network operator send an on-site test-and-fix team to Node 1 as a priority, but it is possible that amelioration actions can be performed (lowering power on an antenna, for example) on Node 1, reducing (not eliminating) PIM to a lower level than Node 2 where such actions are not possible, thus altering the priority of on-site test-and-fix teams. Existing networks can contain tens of thousands of sites. This ability to triage and prioritize PIM fixing is a significant advantage for the network operator.

In addition, since PIM detection leads to on-site PIM correction, and that PIM detection is not necessarily exact, there may be, in the early stages of deployment, before the correlation engines acquire sufficient data for example, or for unforeseen external factors, false positives (PIM detected by the system, but not found by on-site test). There would not be false negatives triggered by the system however, a network operator may send a team on-site to test for PIM that was not initiated by information from the system. Information about the presence or lack of PIM can added to the database and used in the correlation engine to "weight" or adjust various thresholds (as described above) in the correlations used to suggest PIM.

Both the extended use-cases of "active" and "closed-loop" operation, and the facility to include information with regard to the success or failure of on-site PIM testing allow for the refinement of the thresholds mentioned in the criteria listed above, such as the deltas between measured and determined RSSI (both quiet and peak hour), the correlations between RSSI and RERK, and what constitutes high and low in the RERK stability factor, for these allow for an accurate assessment of what constitutes the line between PIM and not-PIM-but-trending-towards-PIM, and similar for external interference.

Figure 10:
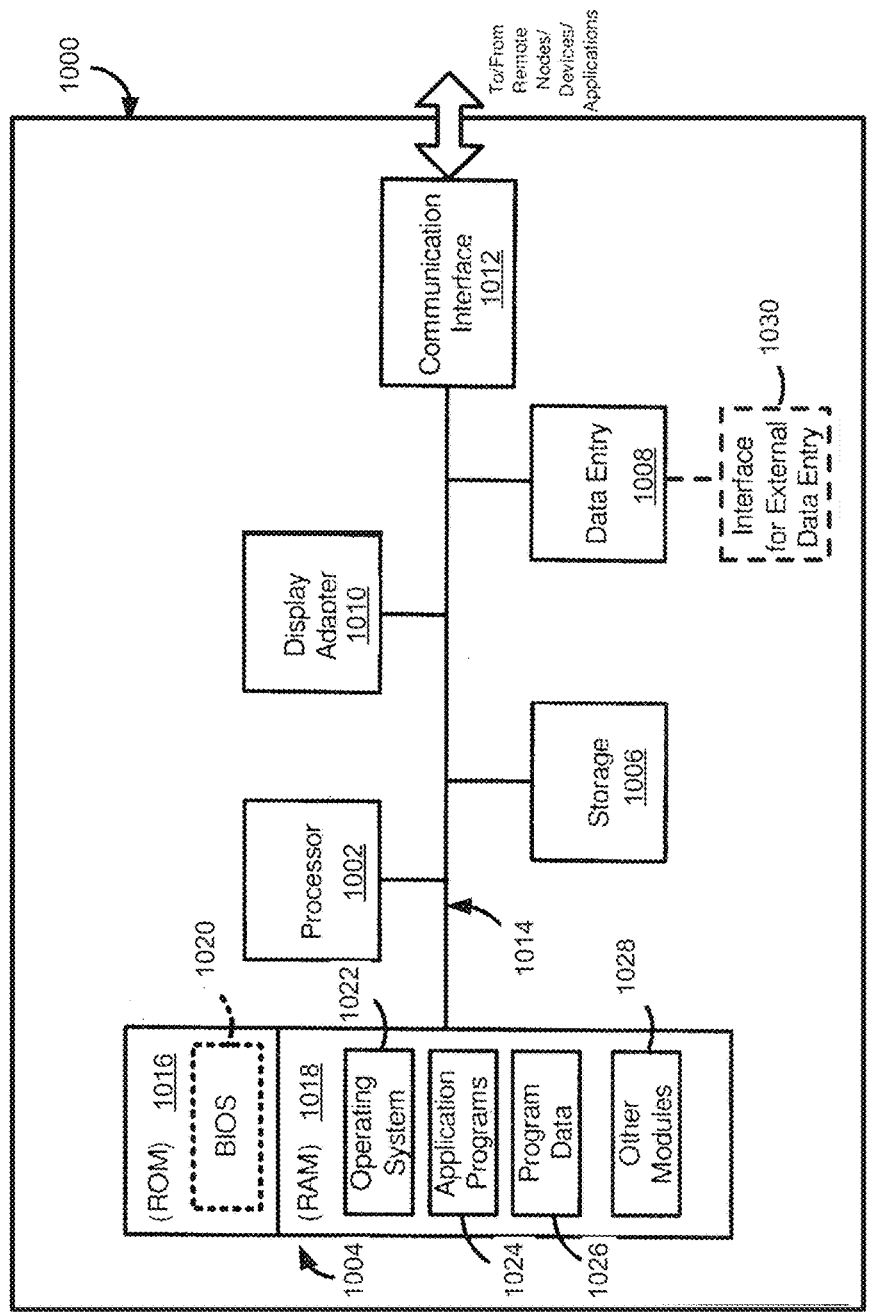
FIG. 10 depicts a block diagram illustrating an exemplary computing system for execution of the operations comprising various embodiments of the disclosure.

FIG. 10 depicts a diagram illustrating an exemplary computing system 1000 for execution of the operations comprising various embodiments of the disclosure. In some embodiments, the computing system 1000 may represent the data analyzer 120, data computation 140 (and/or data source 145), and data computation 150 (and/or data source 155). As shown, the computing system 1000 for implementing the subject matter disclosed herein includes a hardware device 1000 including a processing unit 1002, memory 1004, storage 1006, data entry module 1008, display adapter 1010, communication interface 1012, and a bus 1014 that couples elements 1004-1012 to the processing unit 1002.

The bus 1014 may comprise any type of bus architecture. Examples include a memory bus, a peripheral bus, a local bus, etc. The processing unit 1002 is an instruction execution machine, apparatus, or device and may comprise a microprocessor, a digital signal processor, a graphics processing unit, an application specific integrated circuit (ASIC), a field programmable gate array (FPGA), etc. The processing unit 1002 may be configured to execute program instructions stored in memory 1004 and/or storage 1006 and/or received via data entry module 1008.

The memory 1004 may include read only memory (ROM) 1016 and random access memory (RAM) 1018. Memory 1004 may be configured to store program instructions and data during operation of device 1000. In various embodiments, memory 1004 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 1004 may also include nonvolatile memory technologies such as nonvolatile flash RAM (NVRAM) or ROM. In some embodiments, it is contemplated that memory 1004 may include a combination of technologies such as the foregoing, as well as other technologies not specifically mentioned. When the subject matter is implemented in a computer system, a basic input/output system (BIOS) 1020, containing the basic routines that help to transfer information between elements within the computer system, such as during start-up, is stored in ROM 1016.

The storage 1006 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1000.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1006, ROM 1016 or RAM 1018, including an operating system 1022, one or more applications programs 1024, program data 1026, and other program modules 1028. A user may enter commands and information into the hardware device 1000 through data entry module 1008. Data entry module 1008 may include mechanisms such as a keyboard, a touch screen, a pointing device, etc. Other external input devices (not shown) are connected to the hardware device 1000 via external data entry interface 1030. By way of example and not limitation, external input devices may include a microphone, joystick, game pad, satellite dish, scanner, or the like. In some embodiments, external input devices may include video or audio input devices such as a video camera, a still camera, etc. Data entry module 1008 may be configured to receive input from one or more users of device 1000 and to deliver such input to processing unit 1002 and/or memory 1004 via bus 1014.

A display 1032 is also connected to the bus 1014 via display adapter 1010. Display 1032 may be configured to display output of device 1000 to one or more users. In some embodiments, a given device such as a touch screen, for example, may function as both data entry module 1008 and display 1032. External display devices may also be connected to the bus 1014 via external display interface 1034. Other peripheral output devices, not shown, such as speakers and printers, may be connected to the hardware device 1000.

The hardware device 1000 may operate in a networked environment using logical connections to one or more remote nodes (not shown) via communication interface 1012. The remote node may be another computer, a server, a router, a peer device or other common network node, and typically includes many or all of the elements described above relative to the hardware device 1000. The communication interface 1012 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 1012 may include logic configured to support direct memory access (DMA) transfers between memory 1004 and other devices.

In a networked environment, program modules depicted relative to the hardware device 1000, or portions thereof, may be stored in a remote storage device, such as, for example, on a server. It will be appreciated that other hardware and/or software to establish a communications link between the hardware device 1000 and other devices may be used.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements are not necessarily strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes such as those shown in FIG. 10. At least one component defined by the claims may be implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:

receiving, by a database server over a network connection, a set of key performance indicators (KPIs) over a predetermined period of time for a plurality of radio base stations;

receiving, by a database server over a network connection, values for received signal strength indicator (RSSI) over the predetermined period of time for the plurality of radio base stations;

determining, for each individual base station (in the plurality of base stations) by the database server, stability factors for each KPI of the set of KPIs, the stability factors being defined as a difference between a peak value of each KPI over the predetermined period of time and a value of each KPI at the time of a RSSI peak value over the predetermined period of time;

determining, by the database server, correlation factors for each KPI of the set of KPIs, the correlation factors being defined as how closely changes in the RSSI affect values of each KPI, the correlation factors being determined based on the received KPIs over the predetermined period of time;

selecting, by the database server, KPIs to be RSSI Effecting Reference KPIs (RERKs) based on a comparison of the stability factors and the correlation factors for the set of KPIs;

storing, by the database server, the determined stability factors and the determined correlation factors for the selected RERKs;

receiving, by the database server, KPIs for an identified radio base station comprising RSSI values and RERK values for the identified radio base station;

determining, by the database server, an expected peak RSSI value based on RERK values for the identified radio base station at a peak RSSI value time over the predetermined period of time for the identified radio base station and the determined correlation factors for the selected RERKs;

determining, by the database server, a difference between the determined expected peak RSSI value for the identified radio base station and a peak RSSI value measured at the peak RSSI value time for the identified radio base station; and generating, by the database server, when the determined difference exceeds a first threshold, a recommendation to a user that the identified radio base station be investigated for interference caused by passive intermodulation products.

2. The method of claim 1, the expected peak RSSI value for the identified radio base station being further based on the determined stability factors for the selected RERKs.

3. The method of claim 1, wherein the plurality of radio base stations are a selected group of radio base stations having similar characteristics to the identified radio base station.

4. The method of claim 1, further comprising identifying, from the received KPIs over the predetermined period of time, the value of each KPI at the RSSI peak time and a value of each KPI at a RSSI quiet time, wherein the RSSI peak time is the time of day at which the RSSI value is greatest and the RSSI quiet time is the time of day at which the RSSI value is at its minimum.

5. The method of claim 1, further comprising generating a recommendation to a user that the identified radio base station may have future problems with passive intermodulation when the determined difference exceeds a second threshold and does not exceed the first threshold.

6. The method of claim 1, the generating the recommendation to the user taking place only after the determined difference exceeds the first threshold for a plurality of observed RSSI peak times for the identified radio base station.

7. The method of claim 1, further comprising: identifying, from the received KPIs over the predetermined period of time, a value of each RERK at a RSSI quiet time, wherein the RSSI quiet time is the time of day at which the RSSI value is at its minimum, the received KPIs for the identified radio base station further comprising RERK values for the identified radio base station at a quiet RSSI value time for the identified radio base station; determining, by the database server, an expected quiet RSSI value based on the received RERK values for the identified radio base station at the quiet RSSI value time for the identified radio base station and the determined correlation factors for the selected RERKs; determining, by the database server, a quiet value difference between the determined expected quiet RSSI value for the identified radio base station and a quiet RSSI value measured at the quiet RSSI value time for the identified radio base station; and generating a recommendation to a user that the identified radio base station be investigated for external interference when the determined quiet value difference exceeds a third threshold.

8. The method of claim 1, further comprising, when the determined difference exceeds the first threshold, sending a request to an Operations and Support System (OSS) to perform an automated parameter change for the identified radio base station.

9. The method of claim 1, the RERKs comprising at least two of download physical resource block utilization, upload physical resource block utilization, connected user number, radio connection attempts, upload hybrid automatic repeat request success, and user equipment transmit power of the identified radio base station.

10. A system, comprising at least one processor and memory, to identify potential passive intermodulation problems, the system comprising:

a network communications port communicatively coupled, via a network connection, to an Operations and Support System (OSS) and an identified radio base station; and receive a set of key performance indicators (KPIs) over a predetermined period of time for a plurality of radio base stations from the OSS via the network communications port;

determine, for each individual base station (in the plurality of base stations), a stability factor for each KPI of the set of KPIs, the stability factor being defined as a difference between a peak value of each KPI over the predetermined period of time and a value of each KPI at the time of a received signal strength indicator (RSSI) peak value over the predetermined period of time;

determine a correlation factor for each KPI of the set of KPIs, the correlation factors being defined as how closely changes in the RSSI affect values of each KPI, the correlation factors being determined based on the received KPIs over the predetermined period of time;

select KPIs to be RSSI Effecting Reference KPIs (RERKs) based on a comparison of the stability factors and the correlation factors for the set of KPIs;

store the determined stability factors and the determined correlation factors for the selected RERKs;

receive KPIs for the identified radio base station comprising RSSI values and RERK values for the identified radio base station via the network communications port;

determine an expected peak RSSI value based on RERK values for the identified radio base station at a peak RSSI value time over the predetermined period of time for the identified radio base station and the determined correlation factors for the selected RERKs;

determine a difference between the determined expected peak RSSI value for the identified radio base station and a peak RSSI value measured at the peak RSSI value time for the identified radio base station; and generate, when the determined difference exceeds a first threshold, a recommendation to a user that the identified radio base station be investigated for interference caused by passive intermodulation products.

11. The system of claim 10, the expected peak RSSI value for the identified radio base station being further based on the determined stability factors for the selected RERKs.

12. The system of claim 10, wherein the plurality of radio base stations are a predetermined cell of radio base stations having similar characteristics to the identified radio base station.

13. The system of claim 10, the processor further being configured to identify, from the received KPIs over the predetermined period of time, the value of each KPI at the RSSI peak time and a value of each KPI at a RSSI quiet time, wherein the RSSI peak time is the time of day at which the RSSI value is greatest and the RSSI quiet time is the time of day at which the RSSI value is at its minimum.

14. The system of claim 10, the processor further configured to generate a recommendation to a user that the identified radio base station may have future problems with passive intermodulation when the determined difference exceeds a second threshold and does not exceed the first threshold.

15. The system of claim 10, the generating the recommendation to the user taking place only after the determined difference exceeds the first threshold for a plurality of observed RSSI peak times for the identified radio base station.

16. The system of claim 10, the processor further configured to: identify, from the received KPIs over the predetermined period of time, a value of each KPI at a RSSI quiet time, wherein the RSSI quiet time is the time of day at which the RSSI value is at its minimum, the received KPIs for the identified radio base station further comprising RERK values for the identified radio base station at a quiet RSSI value time for the identified radio base station; determine an expected quiet RSSI value based on the received RERK values for the identified radio base station at the quiet RSSI value time for the identified radio base station and the determined correlation factors for the selected RERKs; determine a quiet value difference between the determined expected quiet RSSI value for the identified radio base station and a quiet RSSI value measured at the quiet RSSI value time for the identified radio base station; and generate a recommendation to a user that the identified radio base station be investigated for external when the determined quiet value difference exceeds a third threshold.

17. The system of claim 10, the processor further configured to, when the determined difference exceeds the first threshold, sending a request to the OSS, via the network communications port, to perform an automated parameter change for the identified radio base station.

18. The system of claim 10, the RERKs comprising at least two of download physical resource block utilization, upload physical resource block utilization, connected user number, radio connection attempts, upload hybrid automatic repeat request success, and user equipment transmit power of the identified radio base station.

19. A non-transitory computer program product comprising a non-transitory computer-readable medium, the non-transitory computer-readable medium storing program code, the program code including instructions to:
receive a set of key performance indicators (KPIs) over a predetermined period of time for a plurality of radio base stations;
determine, for each individual base station (in the plurality of base stations), stability factors for each KPI of the set of KPIs, the stability factors being defined as a difference between a peak value of each KPI over the predetermined period of time and a value of each KPI at the time of a received signal strength indicator (RSSI) peak value over the predetermined period of time;
determine correlation factors for each KPI of the set of KPIs, the correlation factors being defined as how closely changes in the RSSI affect values of each KPI, the correlation factors being determined based on the received KPIs over the predetermined period of time;
select KPIs to be RSSI Effecting Reference KPIs (RERKs) based on a comparison of the stability factors and the correlation factors for the set of KPIs;
store the determined stability factors and the determined correlation factors for the selected RERKs;
receive KPIs for an identified radio base station comprising RSSI values and RERK values for the identified radio base station;
determine an expected peak RSSI value based on RERK values for the identified radio base station at a peak RSSI value time over the predetermined period of time for the identified radio base station and the determined correlation factors for the selected RERKs;
determine a difference between the determined expected peak RSSI value for the identified radio base station and a peak RSSI value measured at the peak RSSI value time for the identified radio base station; and
generate, when the determined difference exceeds a first threshold, a recommendation to a user that the identified radio base station be investigated for interference caused by passive intermodulation products.

* * * * *